(12) United States Patent
Cao et al.

(10) Patent No.: US 10,911,266 B2
(45) Date of Patent: Feb. 2, 2021

(54) MACHINE LEARNING FOR CHANNEL ESTIMATION

(71) Applicant: Parallel Wireless, Inc., Nashua, NH (US)

(72) Inventors: Yang Cao, Westford, MA (US); Nihar Nanda, Acton, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/417,492

(22) Filed: May 20, 2019

(65) Prior Publication Data

US 2019/0356516 A1  Nov. 21, 2019

Related U.S. Application Data

(60) Provisional application No. 62/673,722, filed on May 18, 2018.

(51) Int. Cl.
*H04L 25/02* (2006.01)
*H04B 7/0413* (2017.01)

(52) U.S. Cl.
CPC ...... *H04L 25/0254* (2013.01); *H04L 25/0224* (2013.01); *H04L 25/0256* (2013.01); *H04B 7/0413* (2013.01)

(58) Field of Classification Search
CPC ............. H04L 25/0254; H04L 25/0256; H04L 25/0224; H04L 25/0204; H04B 7/0413
See application file for complete search history.

(56) References Cited

U.S. PATENT DOCUMENTS 8,498,639 B2  7/2013  Chen et al.
9,875,440 B1  1/2018  Commons
(Continued)

FOREIGN PATENT DOCUMENTS

CN  101986586 A  3/2011

OTHER PUBLICATIONS

David Neumann, Thomas Wiese, Wolfgang Utschick, "Learning the MMSE Channel Estimator", eprint arXiv:1707.05674v3, Feb. 6, 2018.
(Continued)

*Primary Examiner* — Vineeta S Panwalkar
(74) *Attorney, Agent, or Firm* — Michael Y. Saji; David W. Rouille

(57) ABSTRACT

Systems and methods are disclosed for performing training using superimposed pilot subcarriers to determine training data. The training includes starting with a training duration (T) equal to a number of antennas (M) and running a Convolutional Neural Network (CNN) model using training samples to determine if a testing variance meets a predefined threshold. When the testing variance meets a predefined threshold, then reducing T by one half and repeating the running Convolutional Neural Network (CNN) model until the testing variance fails to meet the predefined threshold. When the testing variance fails to meet the predefined threshold, then multiplying T by two and using the new value of T as the new training duration to be used. Generating a run-time model based on the training data, updating the run-time model with new feedback data received from a User Equipment (UE), producing a DL channel estimation from the run-time model; and producing an optimal precoding matrix from the DL channel estimation.

16 Claims, 16 Drawing Sheets

(56) References Cited

U.S. PATENT DOCUMENTS

| | | | |
|---|---|---|---|
| 2014/0313908 A1* | 10/2014 | da Silva | H04W 4/70 370/252 |
| 2017/0201976 A1 | 7/2017 | Yue et al. | |
| 2019/0149425 A1 | 5/2019 | Larish et al. | |
| 2019/0349037 A1* | 11/2019 | O'Shea | G06N 3/08 |

OTHER PUBLICATIONS

M. Sanchez-Fernandez, M. De-Prado-Cumplido, J. Arenas-Garcia, F. Perez-Cruz, "SVM Multiregression for Nonlinear Channel Estimation in Multiple-Input Multiple-Output Systems", IEEE Transactions on Signal Processing, Volume: 52, Issue: 8, Aug. 2004.

Emamnuel Candes, "Compressive Sampling", Proceedings of the International Congress of Mathematicians, Madrid, Spain, 2006 © 2006 European Mathematical Society, California Institute of Technology, Pasadena, USA.

'Han Minh Nguyen "A Learning Approach to Compressed Sensing", Stanford University, 2017.

Min Soo Sim, Jeonghun Park, Chan-Byoung Chae, Robert W. Heath, Jr., "Compressed Channel Feedback for Correlated Massive Mimo Systems", arXiv:1503.09002v1, Mar. 31, 2015.

Zhen Gao, Linglong Dai, Zhaocheng Wang, "Structured Compressive Sensing Based Superimposed Pilot Design in Downlink Large-Scale Mimo Systems", vol. 00 No. 00, Electronics Letters, Mar. 5, 2014.

Weng Chon Ao, Whenwei Wang, Ozgun, Y. Bursalioglu, Haralabos Papadopoulos, "Compressed Sensing-based Pilot Assignment and Reuse for Mobile UEs in mmWave Cellular Systems", Docomo Innovations, Inc. Palo Alto CA, Jan. 14, 2016.

Wenqian Shen, Linglong Dai, Yi Shi, Zhen Gao, Zhaocheng Wang, "Massive MIMO Channel Estimation Based on Block Iterative Support Detection", Tsinghua National Laboratory for Information Science and Technology (TNlist) Department of Electronic Engineering, Tsinghua University, Beijing, 100084, China, Huawei Technologies, Beijing, 100085, China, Apr., 2016.

Jie Yang, "A Machine Learning Paradigm Based on Sparse Signal Representation", Doctor of Philosophy Thesis, School of Electrical, Computer and Telecommunications Engineering, University of Wollongong, 2013, http://ro.uow.au/thesis/3898.

Terence Tao, "Compressed Sensing and Single-Pixel Cameras" Apr. 13, 2007.

Juei-Chin Shen, Jun Zhang, Kwang-Cheng Ci-Ien, Ki-Ialed B. Letaief, "High-Dimensional CSI Acquisition in Massive MIMO: Sparsity-Inspired Approaches", IEE SYstems Journal, vol. 11, No. 1, Mar. 2017.

Igor Carron, "How is Compressed Sensing Going to Change Machine Learning?" Machine Learning (Theory), Jun. 19, 2007.

Menglu Sun, Yingzhi Zhao, "Joint Channel Estimation Based on Compressive Sensing for Multi-User Massive MIMO-OFDM Systems," IJISET—International Journal of Innovative Science, Engineering & Technology, vol. 4, Issue 4, Apr. 2017.

Sinh L. H. Nguyen, "Compressive Sensing for Multi-Channel and Large-Scale MIMO Networks", Concordia University, A Thesis in the Department of Electrical and Computer Engineering, Aug. 2013.

Jun Won Choi, Byonghyo Shim, "Compressive Sensing Based Pilot Reduction Technique for Massive MIMO Systems", 2015 Information Theory and Applications Workshop (ITA), Oct. 29, 2015.

Whenqian Shen, Linlgon Dai, Zhen Gao, Zhaocheng Wang, "Spatially Correlated Channel Estimation Based on Block Iterative Support Detection for Massive MIMO Systems", Electronics Letters, vol. 51, No. 7, pp. 587-588, Apr. 2, 2015.

* cited by examiner

MACHINE LEARNING FOR CHANNEL ESTIMATION

CROSS-REFERENCE TO RELATED APPLICATIONS

This application claims priority under 35 U.S.C. § 119(e) to U.S. Provisional Pat. App. No. 62/673,722, filed May 18, 2018, titled "Machine Learning for Channel Estimation" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839 in its entirety. This document also hereby incorporates by reference U.S. patent application Ser. No. 16/271,778, "Data Pipeline for Scalable Analytics and Management," in its entirety, which is contemplated to provide the system on which this disclosure can be run.

BACKGROUND

Large-scale multiple-input multiple-output (MIMO) with high spectrum and energy efficiency is a very promising key technology for future 5G wireless communications. For large-scale MIMO systems, accurate channel state information (CSI) acquisition is a challenging problem, especially when each user has to distinguish and estimate numerous channels coming from a large number of transmit antennas in the downlink.

Massive MIMO radio transmitters are known to one of ordinary skill in the art. In radio, multiple-input and multiple-output, or MIMO is a method for multiplying the capacity of a radio link using multiple transmission and receiving antennas to exploit multipath propagation. At one time, in wireless the term "MIMO" referred to the use of multiple antennas at the transmitter and the receiver. In modern usage, "MIMO" specifically refers to a practical technique for sending and receiving more than one data signal simultaneously over the same radio channel by exploiting multipath propagation. MIMO is synergistically compatible with smart antenna techniques developed to enhance the performance of a single data signal, such as beamforming and diversity. "Massive MIMO" is the extension of the MIMO concept to use large antenna arrays to simultaneously serve many autonomous terminals using multiple antennas, but using the smart antenna techniques of beamforming, etc. to provide spatial multiplexing of many terminals in the same time-frequency resource with high energy efficiency. A typical massive MIMO antenna is a 64T64R (T=transmit, R=receive) antenna array of substantial physical size.

A new technique called Compressive Sensing (CS) is now available for use. According to Nyquist, a signal should be sampled at a rate at least twice its highest frequency in order to be represented without error. However, in practice, we often compress the data soon after sensing, trading off signal representation complexity (bits) for some error (consider JPEG image compression in digital cameras, for example). Over the past few years, a new theory of "compressive sensing" has begun to emerge, in which the signal is sampled (and simultaneously compressed) at a greatly reduced rate. For further discussion of compressive sensing, please see Emmanuel Candès, Compressive Sampling. ((Int. Congress of Mathematics, 3, pp. 1433-1452, Madrid, Spain, 2006)), hereby incorporated by reference in its entirety and in particular for the purpose of describing compressive sampling and compressive sensing as referred to herein.

For compressive sensing, among a finite list of key eigenvectors, a user can identify which dimensions are key, which is much less than the full rank. A problem with this approach is that the user must know a priori which eigenvectors are the key eigenvectors, but in reality these can shift and may not always appear in the same slot or position. This means to date this approach has been limited to less-dynamic systems, e.g., fixed wireless links.

One of the challenges faced by a compressive sensing based approach is that the real-world data is not exactly sparse in a fixed basis. Current high-performance recovery algorithm are slow to converge, which essentially limits CS to either non-real-time applications or scenarios where massive back-end computing is available.

SUMMARY

Unlike the conventional orthogonal pilots whose pilot overhead prohibitively increases with the number of transmit antennas, a spectrum-efficient superimposed pilot design for downlink large-scale MIMO scenarios, where frequency-domain pilots of different transmit antennas occupy the completely same subcarriers in the frequency domain is described. Meanwhile, spatial-temporal common sparsity of large-scale MIMO channels motivates us to exploit the emerging theory of structured compressive sensing (CS) for reliable MIMO channel estimation, which is realized by the proposed structured subspace pursuit (SSP) algorithm to simultaneously recover multiple channels with low pilot overhead.

In one example embodiment, a method of machine learning for channel estimation includes performing training using superimposed pilot subcarriers to determine training data. The training includes starting with a training duration (T) equal to a number of antennas (M) running a Convolutional Neural Network (CNN) model and using training samples to determine if a testing variance meets a predefined threshold. When the testing variance meets a predefined threshold, then reducing T by one half and repeating the step of running Convolutional Neural Network (CNN) model using training samples and the step of reducing the T by one half until the testing variance fails to meet the predefined threshold. When the testing variance fails to meet the predefined threshold, then multiplying T by two and using the new value of T as the new training duration to be used. The method further includes generating a run-time model based on the training data, updating the run-time model with new feedback data received from a User Equipment (UE), producing a DL channel estimation from the run-time model; and producing an optimal precoding matrix from the DL channel estimation.

In another example embodiment, a non-transitory computer-readable medium contains instructions for providing machine learning for channel estimation which, when executed, cause a network system to perform steps. The steps include performing training using superimposed pilot subcarriers to determine training data. The training includes starting with a training duration (T) equal to a number of antennas (M); running a Convolutional Neural Network (CNN) model using training samples to determine if a testing variance meets a predefined threshold; when the testing variance meets a predefined threshold, then reducing T by one half and repeating the running Convolutional Neural Network (CNN) model using training samples and reducing the T by one half until the testing variance fails to meet the predefined threshold; and when the testing variance fails to meet the predefined threshold, then multiplying T by two and using the new value of T as the new training duration to be used. The computer-readable medium further includes instructions for generating a run-time model based on the training data, updating the run-time model with new feedback data received from a User Equipment (UE), producing a DL channel estimation from the run-time model; and producing an optimal precoding matrix from the DL channel estimation.

In another example embodiment, a network system for providing machine learning for channel estimation is described. The system includes a base station, a HetNet Gateway (HNG) in wireless communication with the base station, a Self-Organizing Network (SON) in communication with the HNG, an external data source in communication with the SON, and a data lake in communication with the external data source and the HN. In operation, operational data is collected at the HNG and sent to the data lake where models are developed using data lake data and external source data and deployed to the SON. The SON includes internal models and external models which are used with the models developed using the data lake and external source data to provide input to the SON and the SON supplies the HNG with SON parameters. The models feedback data to the data lake.

DETAILED DESCRIPTION

Figure 1:
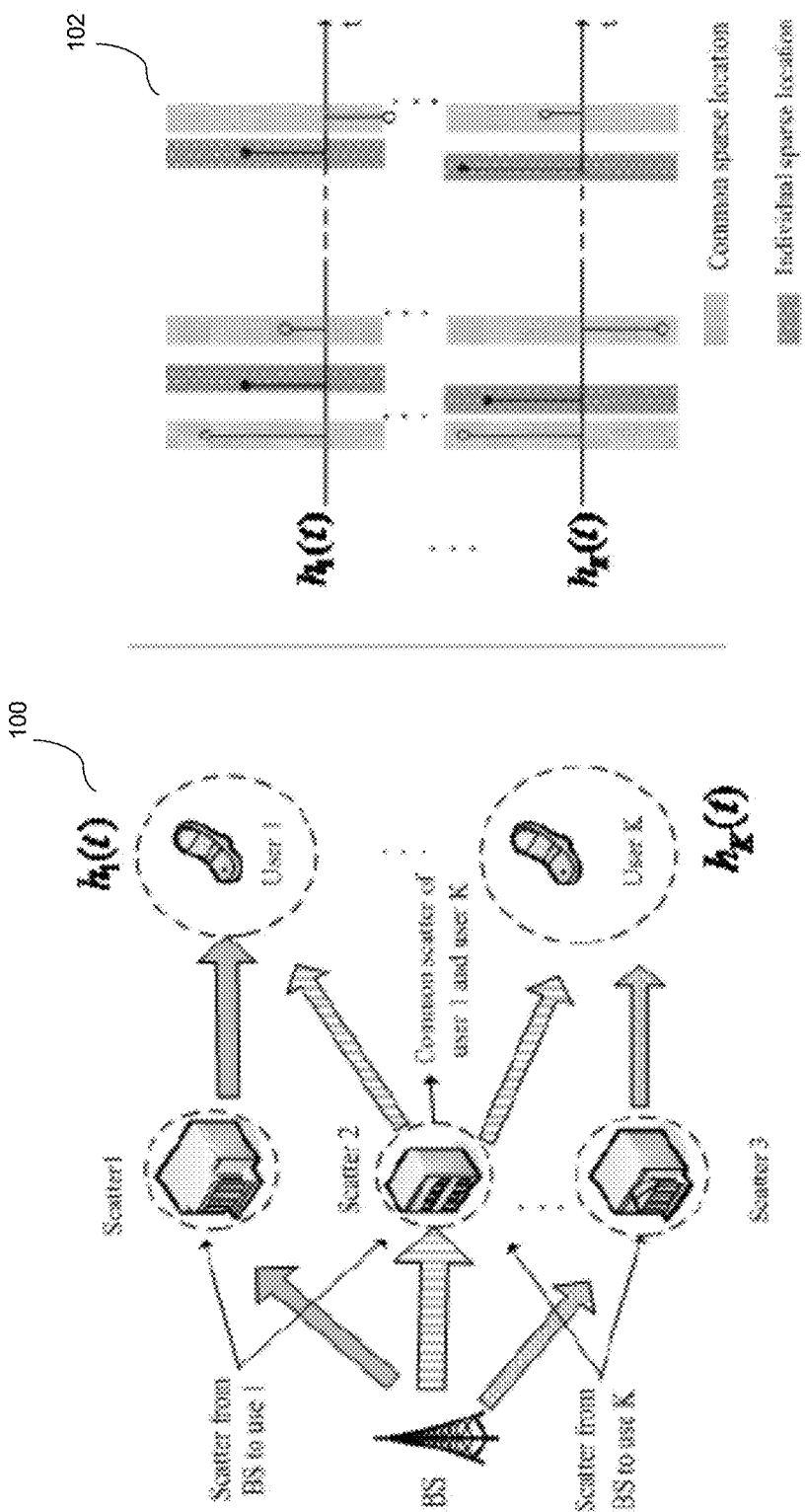
FIG. 1 is a diagram showing multiple levels of sparsity in massive MIMO, in accordance with some embodiments.

In channel estimation, the better the channel is learned, the more efficiently a signal can be sent out in order to make it robust against noise. It is important to learn interference, other emitters, etc., otherwise potential radius of the cell is smaller. Channel estimation as described herein can be performed in any combination of: per-slot, per-subcarrier, per-UE, where the number of subcarriers per user is determined by the RAN.

Superimposed pilots are used due to the fact that there is no need to increase the number of subcarriers used even as the number of antennas used increases. Massive MIMO used in 4G, utilizes 2, 4, or 8×8 antenna arrays. 5G immediately increases this to 256. This is because in 5G, a higher frequency band is used, resulting in shorter antenna spacing (minimum spacing is ½). Concomitantly, the overhead for channel estimation is linearly proportional to the number of antennas.

Channel estimation with TDD is relatively simple. The input from the uplink is taken and an assumption made that the downlink is the same (channel reciprocity), as it is only 2 or 3 slots offset from the downlink. Channel estimation with FDD is more difficult. Separate frequency bands are used for UL versus DL. FDD constitutes the majority of deployments.

Massive MIMO has demonstrated the potential to significantly improve the spectral efficiency for sub-6 GHz band. The most challenging issue facing Massive MIMO deployment is cost-effective & accurate channel estimation. Although a TDD based pilot approach has been proposed leveraging channel reciprocity, the majority of deployment is FDD based. Via traditional scheme, the number of pilot subcarriers, training duration and feedback overall will all explode linearly proportional to the number of Tx antenna.

In one embodiment, FDD channel estimation is performed using superimposed pilot subcarriers, instead of traditional orthogonal subcarriers. This can result in reducing the number of subcarriers required down from M*Np to Np; (M is the number of transmitter antennas; Np is the number of subcarriers required per Tx antenna)

Another goal is to significantly reduce training duration via deep learning and significantly reducing feedback overhead via deep learning. All of these significant reductions are possible via exploiting the nature of spatial-temporal common sparsity of wireless channels.

In another example embodiment, offline training the first deep-learning engine to learn DL (downlink) channel estimation is performed. Once this is done, the following objectives have been achieved: the UE can use this deep-learning engine to learn DL channel estimation real-time (i.e., online) based on received inputs, and from the base-station side, during real-time operation, the DL pilot cost is significantly reduced because the training pilot duration is minimized.

During real-time (online), the UE will obtain actual DL channel estimation (H) based on received inputs via feeding these inputs to the offline trained deep-learning machine (via 1). Subsequently, via the second set of offline trained deep-learning engine the UE can feed the learned DL channel estimation (H) (via step 2) and obtain the compressed encoded feedback; the compressed encoded feedback is sent back by the UE to the base station (hence minimizing the UL feedback cost). The base station feeds the received compressed encoded feedback to the second half of trained deep-learning engine to recover the DL channel estimation as obtained by the UE. Once the DL channel estimation is recovered, the base station can design the optimal precoding matrix accordingly. Both offline deep-learning machines can be calibrated periodically.

Via this, both DL and UL transmission cost can be significantly reduced in the massive-MIMO context.

FIG. 1 is a diagram showing the multiple level of sparsity demonstrated in Massive MIMO. Diagram 100 and the graph 102 are shown in the context of massive MIMO, due to the physical propagation characteristics of multiple channels and close antenna spacing at the base station, Channel Impulse Responses (CIRs) associated with different antennas have similar arrival times, and thus they share a common support.

Figure 2:
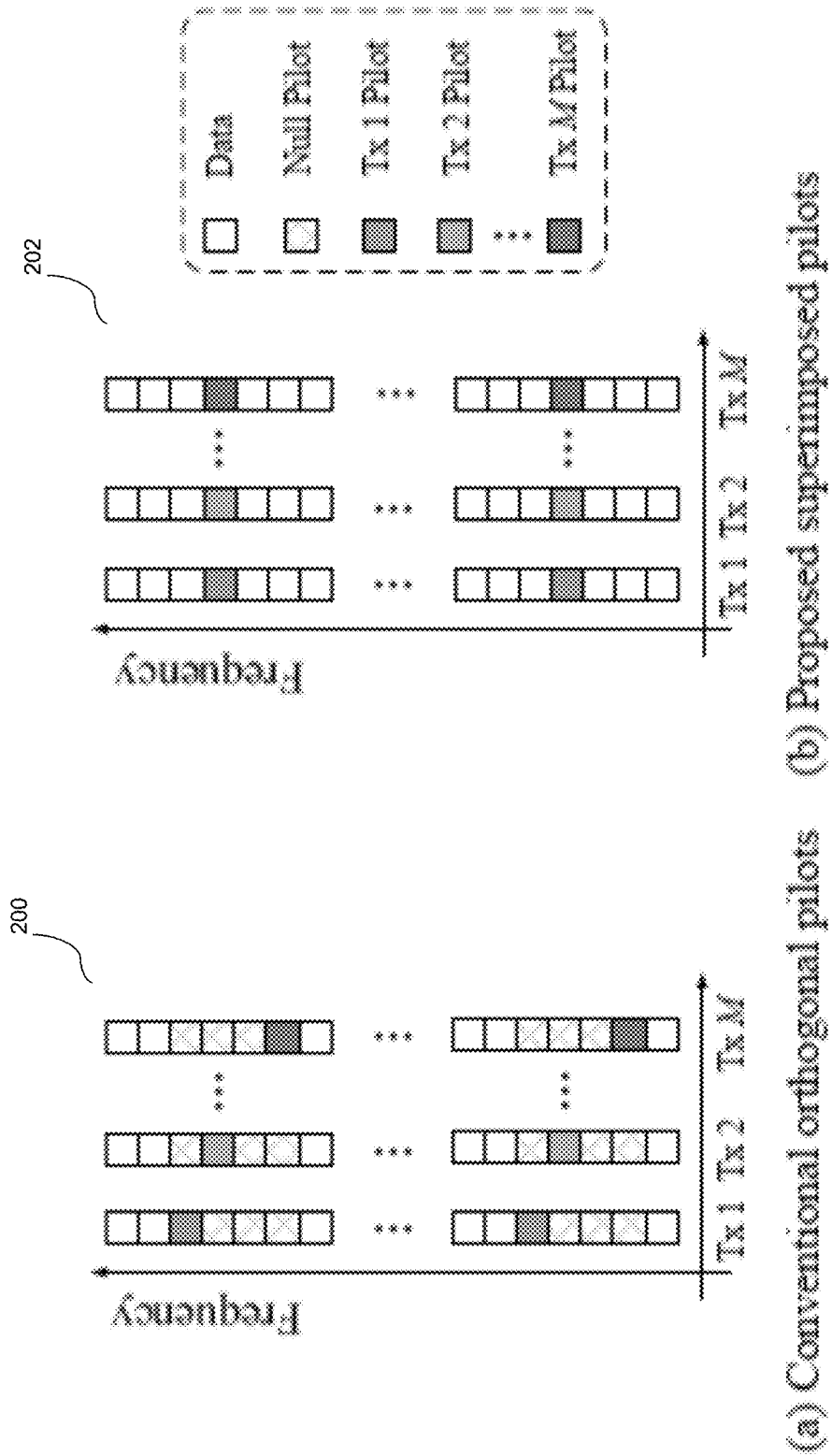
FIG. 2 is a graph showing conventional orthogonal pilots and superimposed pilots, in accordance with some embodiments.

Superimposed pilots may be sued as part of the process for channel estimation. FIG. 2 shows a first graph 200 of conventional orthogonal pilots and a second graph 202 of superimposed pilots.

Figure 3:
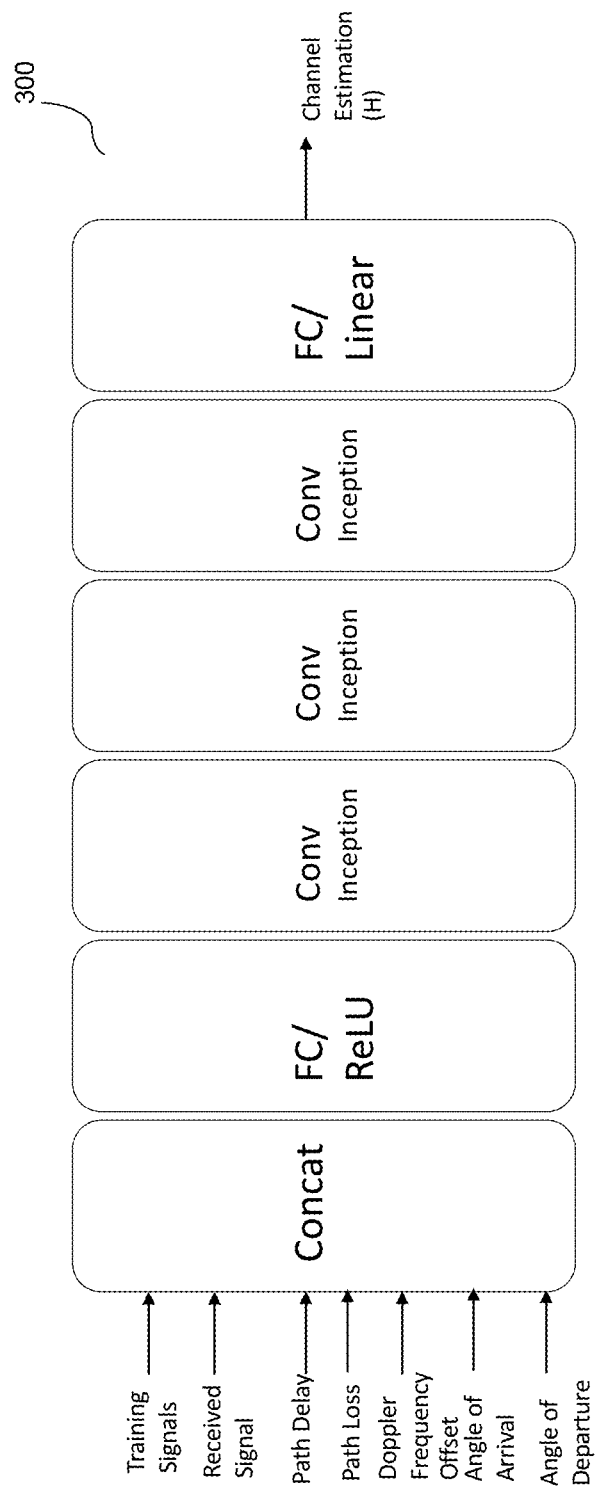
FIG. 3 is a first block diagram showing DL-CNN based channel estimation, in accordance with some embodiments.

One real-time adaptive signal recovery scheme is required. Deep CNN carries the potential to address this challenge. One embodiment involves DL channel estimation with minimal training duration. For downlink training, the longer the total training duration T, the higher training cost. Traditionally, in order to solve the Moore-Penrose pseudo-inverse, robust DL channel estimation requires T greater than or equal to N, where N refers to the number of Tx antennas. By leveraging spatial-temporal signal sparsity, we are using a binary-tree and CNN based approach to minimize the DL training duration FIG. 3 shows an example embodiment of DL-CNN channel estimation with detailed dimensions 300. The DL-CNN is running per time slot per carrier. The DL-CNN shown above is running per time slot per subcarrier. Assuming the training duration is T, and the number of training vectors (including input & channel vectors) is Y. The CNN shown in FIG. 3 will be trained offline with T*Y samples. The offline training (re-calibration) process will be repeated to adapt to channel change. The interval is based on running performance. Training loss function is based on $MSE=E(\hat{H}-H)^2$. Here $\hat{H}$ is actual channel vector and H is CNN's channel estimation. Channel multi-path parameters are acquired via channel sounding.

Figure 4:
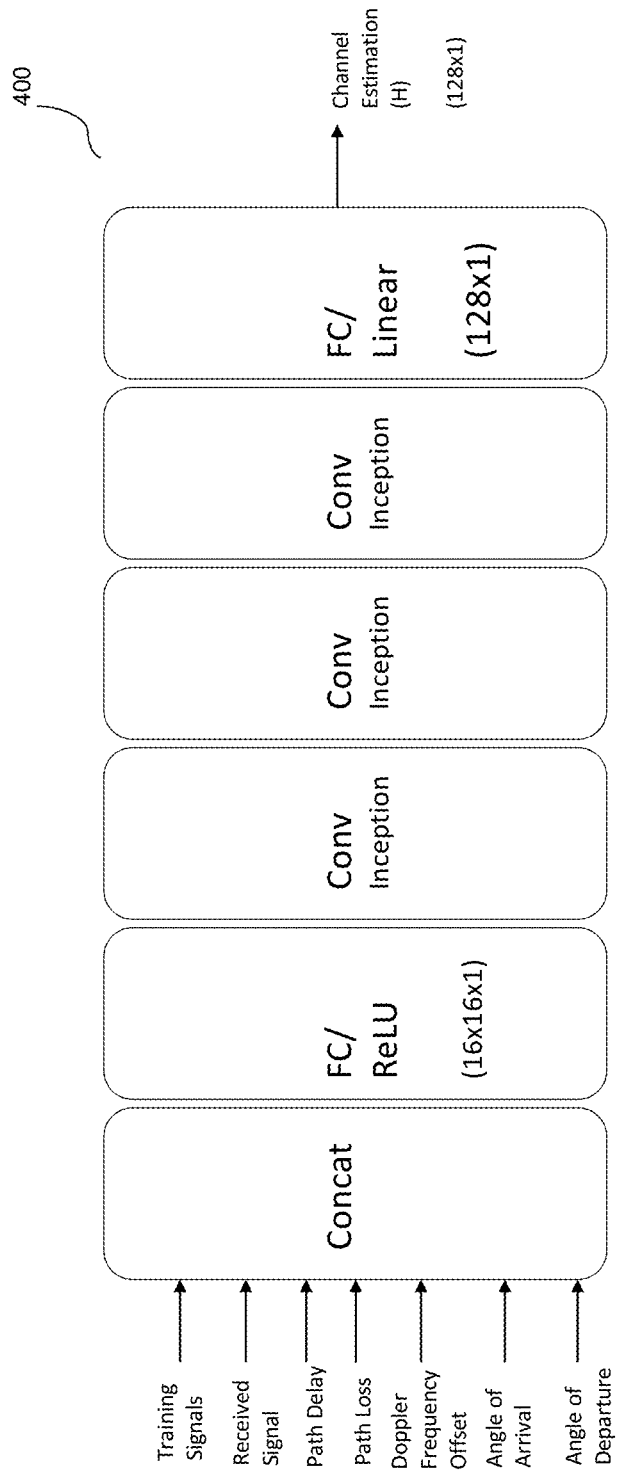
FIG. 4 is a second block diagram showing DL-CNN based channel estimation, in accordance with some embodiments.
Figure 5:
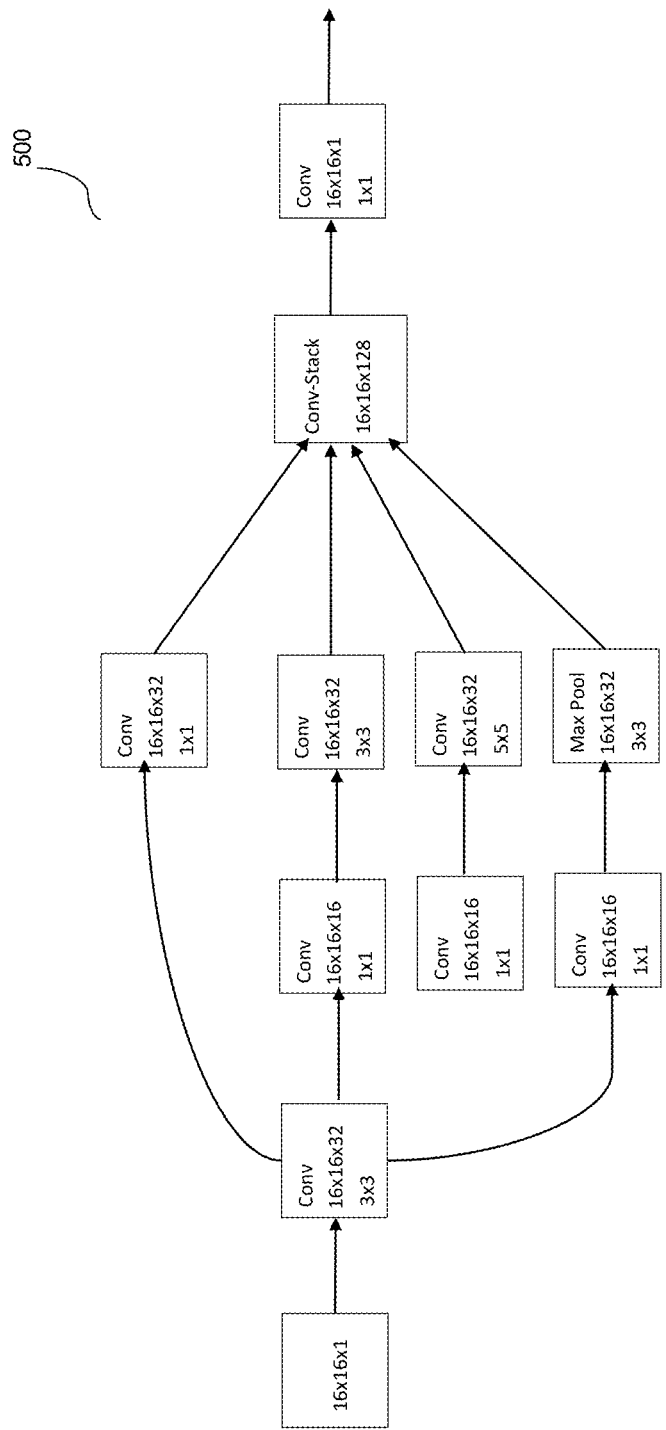
FIG. 5 is a block diagram showing convoluted inception module dimension cells, in accordance with some embodiments.

FIG. 4 shows another example embodiment of DL-CNN channel estimation with detailed dimensions 400. The DL-CNN shown above is running per time slot per subcarrier. Assuming the number of Tx Antenna is M=128, training duration is T=M/2=64, # the number of channel paths L=7. Given this, the input is 164. The offline training (re-calibration) process will be repeated to adapt to channel change. The interval is based on running performance. Training loss function is based on $MSE=E(\hat{H}-H)^2$. Here $\hat{H}$ is actual channel vector and H is CNN's channel estimation. During the run-time, the base station uses the model to estimate the channel, and subsequently generate the precoding matrix. Optionally, as shown in FIG. 5, the base station can also use the UL feedback to recover the channel learned by the UE.

Figure 6:
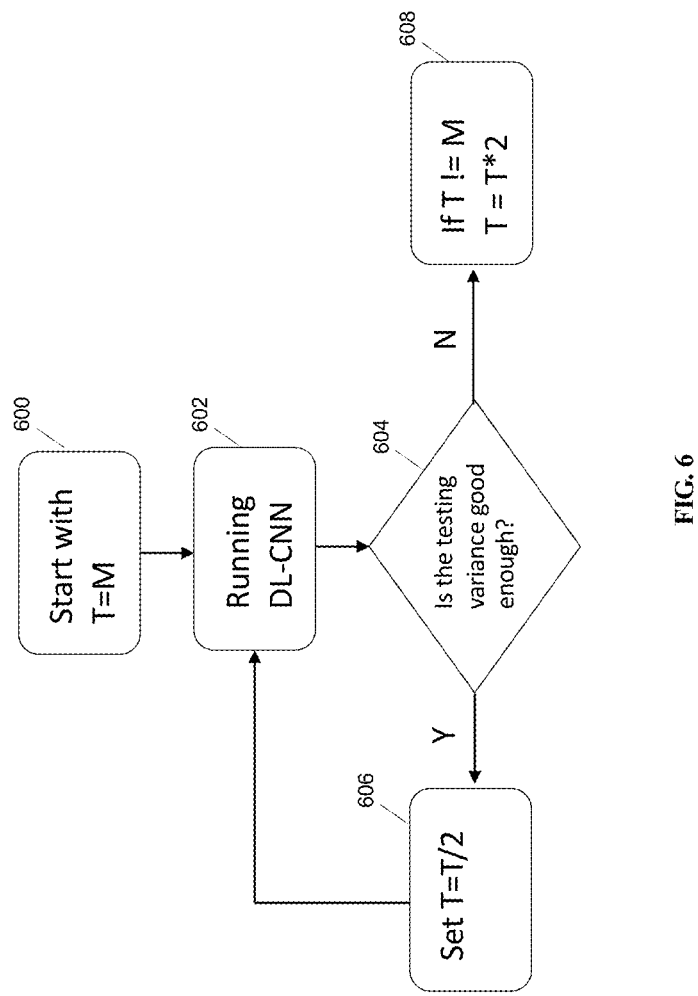
FIG. 6 is a flow diagram showing binary tree and CNN enabled minimal training duration, in accordance with some embodiments.

FIG. 6 is a flow diagram showing determination of the minimal training duration in one embodiment using a binary tree. The method begins with processing block 600 which starts with the training duration T set equal to the number of antennas M. At processing block 602 the DL-CNN channel estimation is run using training samples. At decision block 604, a determination is made whether the testing variance is good enough. The threshold used for determining if the testing variance is good enough is one embodiment is a predefined means-square error against the fully-known channel, e.g., less 0.5% of the known channel. The threshold could be based on, e.g., required data rate or parameter based on the known complexity of the channel (as these affect how often the channel estimate changes). When the testing variance is good enough, as shown in processing block 606, then the training duration is reduced by one half, and the channel estimation 602 run again. This loop is repeated until the determination at block 604 is that the testing variance is not good enough at this value of T. Processing block 608 then doubles the value of T (returning T to the minimal value that provided acceptable testing variance). Other embodiments could use any other search algorithm, e.g., simulated annealing, etc. Retune/recalibration could be offline and periodic.

Figure 7:
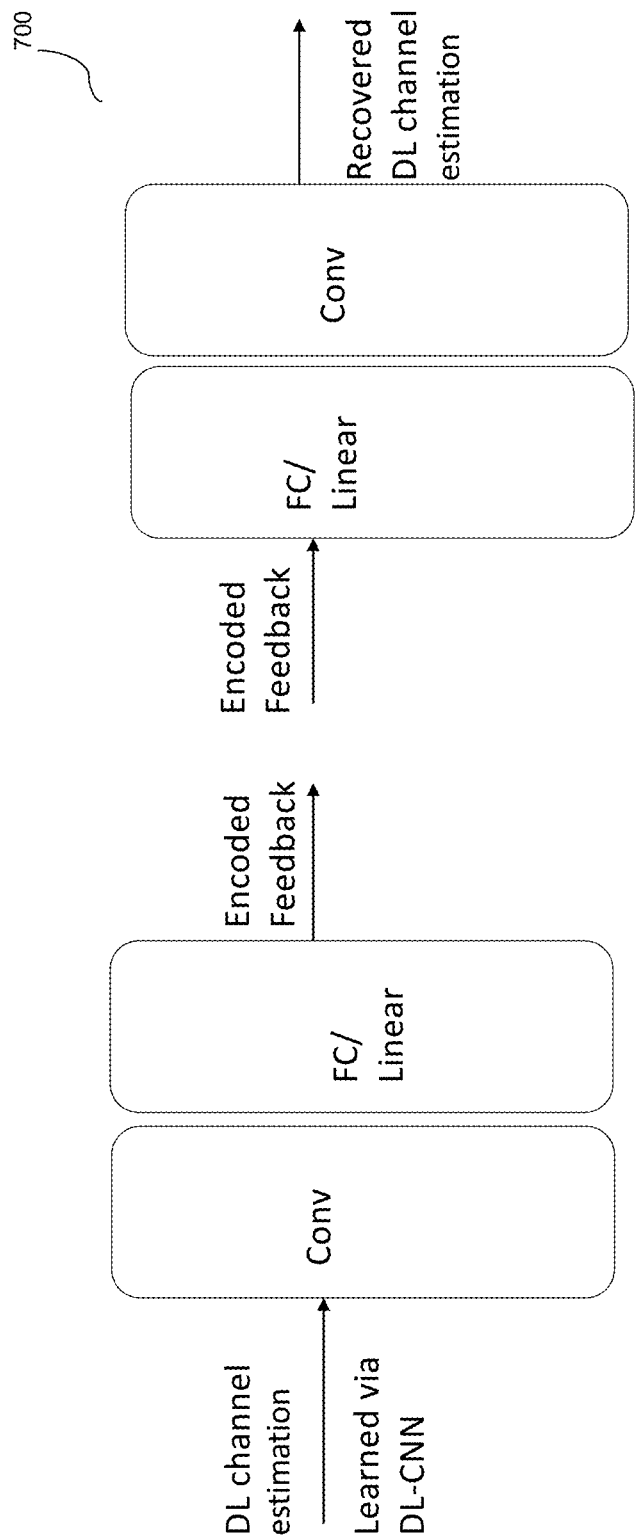
FIG. 7 is a block diagram showing UL-CNN based feedback optimization at a UE, in accordance with some embodiments.

FIG. 7 shows the UL-CNN based Feedback Optimization (at UE). Assuming the number of superimposed carriers assigned to this UE is K, and assuming the number of Tx is M, the H as learned from the previous DL-CNN has dimension M×K. The offline training (re-calibration) process will be repeated to adapt to channel change. The interval is based on running performance. With UL-CNN of FIG. 7, the result can be encoded with a down-sampling ratio of x. Here x can be 1/16 or 1/32, or even 1/64, depending on the sparsity.

Figure 8:
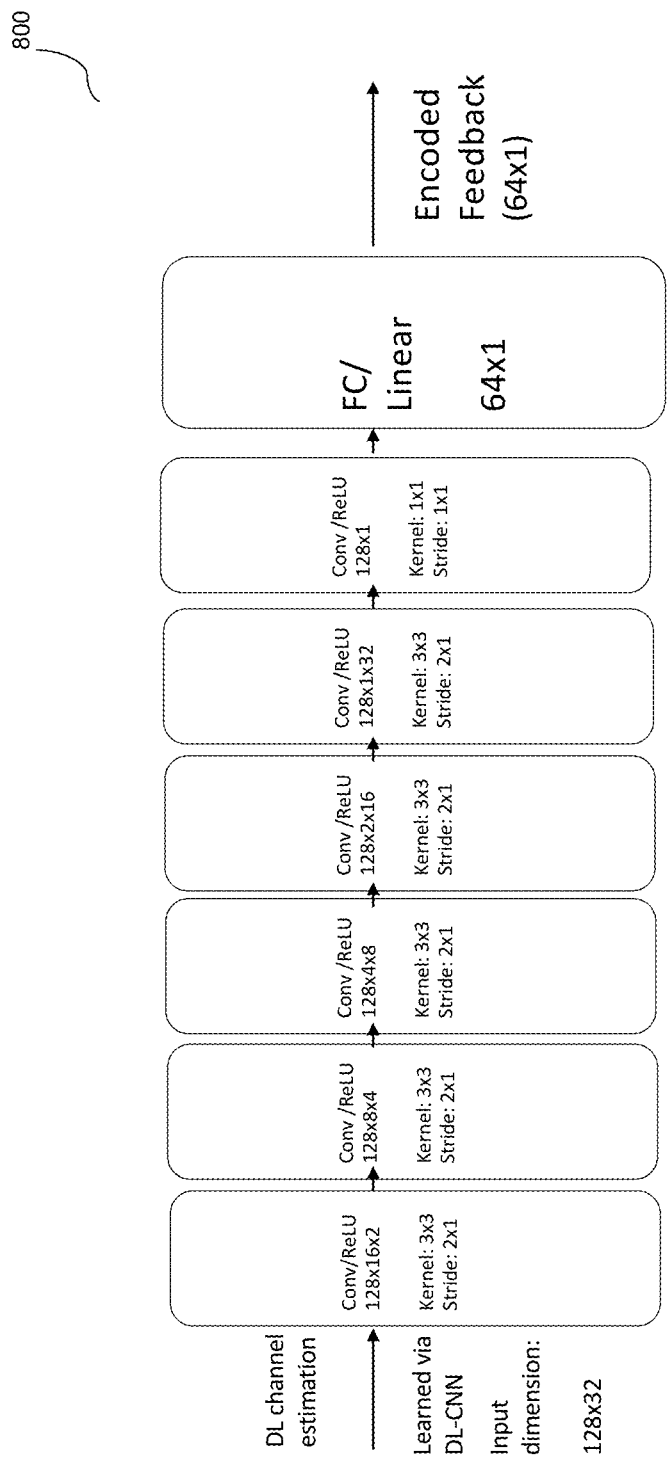
FIG. 8 is a first block diagram showing UL-CNN based feedback optimization at a base station, in accordance with some embodiments.

FIG. 8 shows UL-CNN based Feedback Optimization using detailed encoder dimension at a base station. Assuming the number of superimposed carriers assigned to this UE is 32, and assuming the number of Tx is 128, the H as learned from the previous DL-CNN has dimension 128×32.

With UL-CNN shown in FIG. 8, this will be encoded with down-sampling ratio of x=64, i.e. encoding via 64 bits.

Figure 9:
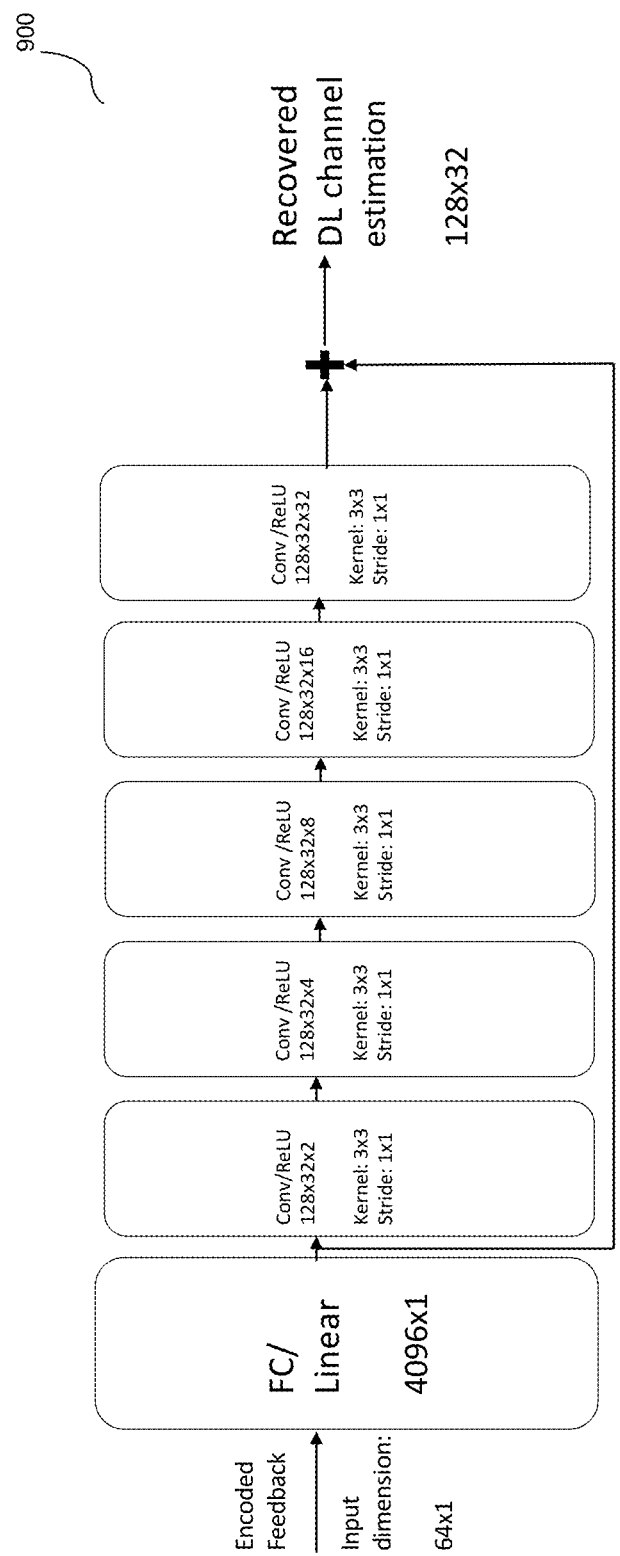
FIG. 9 is a second block diagram showing UL-CNN based feedback optimization at a base station, in accordance with some embodiments.

FIG. 9 shows UL-CNN based Feedback Optimization using detailed encoder dimension at a base station. Assuming the number of superimposed carriers assigned to this UE is 32, and assuming the number of Tx is 128, the H as learned from the previous DL-CNN has dimension 128×32. With UL-CNN of FIG. 9, this will be encoded with down-sampling ratio of x=64, i.e. encoding via 64 bits.

For 5G channel estimation, the number of antennas used is changing or variable. The physical environment is not changing. Physically, how many scatters there are in a particular environment is fixed for the most part. The present methods for channel estimation utilize this invariant part to provide insight into the appropriate sparseness observed in the channel. This is a finite number of elements (number of buildings, for example). The observed scatter points are used to dimension accordingly.

One method for determining channel estimation is to superimpose pilot subcarriers. Typically, the number of slots used for training (training duration) is equal to the number of antennas. This ensures that the rank of the matrix is at least the number of antennas. Then the pseudo-inverse can be done, and used for feedback.

In one embodiment a binary-tree and Convolutional Neural Network based approach to minimize the DL training duration is described. This approach involves offline learning. Superimposed pilots are used and will not increase with the number of antennas. What is received, for each training signal (from the handset); this info needs to be collected and paired with the pilot. Several channel-specific pieces of information, e.g., path delay, path loss, doppler frequency offset, angle of arrival, angle of departure are collected. This can be determined by requesting the UE to provide info derived via 3GPP channel sounding procedure. Learn each path, with each path having each of these 5 parameters; these parameters are collected in advance; the number of paths is determined in advance by, e.g., drive test, drone. UE can also be harnessed to obtain this via CSI reporting as described in 3GPP TS 36.213, hereby incorporated by reference.

In one embodiment, 10000 samples are collected and split with 8000 used for testing, and 2000 used for training. A runtime model is generated. The model can run at the BS and at the UE. The model is updated with new feedback information received from the UE. A precoding matrix is produced as required.

Changing channel conditions are handled by allowing both a predetermined number of paths, which can allow for both the original static nature, and any new dynamic paths. The model learns dynamically based on the dynamic data, to some extent. This is a distinction over typical channel sensing, which requires/assumes a static picture of the channel.

In other embodiments more or fewer antennas can be characterized and the number of durations is also able to be fine-tuned to be more or less expensive.

Figure 10:
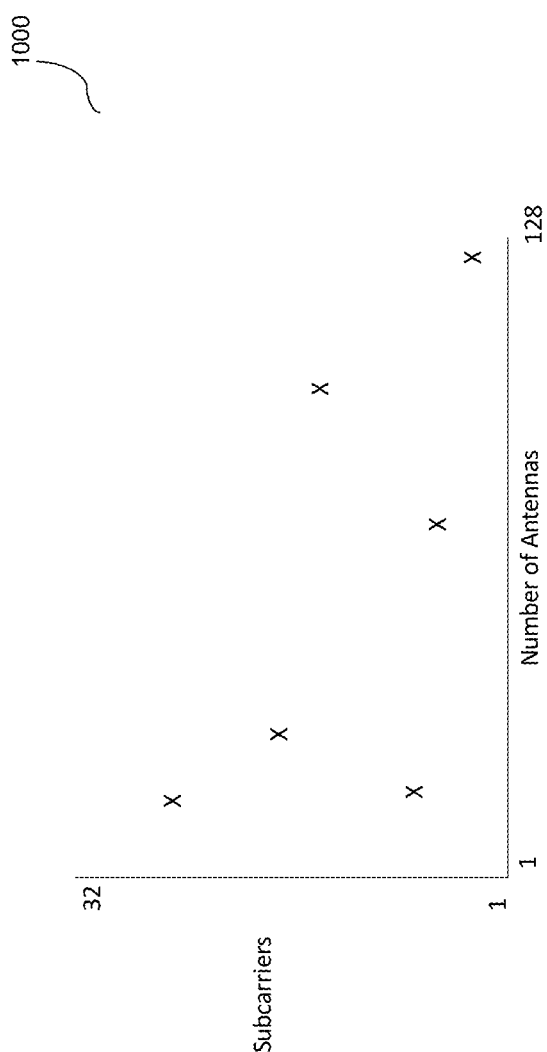
FIG. 10 is a graph of a sparse matrix, in accordance with some embodiments.

In another embodiment, the feedback bits required from UE are reduced. The output of the offline DL-CN is a channel estimate per subcarrier. The UE can use this as input for feedback. The base station asks for feedback on n subcarriers. But the more sub-carriers requested for feedback, the more bandwidth required on UL. Each subcarrier does not have an orthogonal channel estimate because it is known that the matrix characterizing the channel is sparse. As shown in FIG. 10 the matrix 1000 shows the number of subcarriers versus number of antennas. Not all of these are needed. A subset of all combinations of antennas and subcarriers may be mapped, but this is acceptable since in reality the interferers can be represented with a sparse matrix.

An efficient compression scheme can be identified according to compressive sensing (i.e., identification of relevant subcarrier-antenna channels) such that the feedback is less. Once the compressed feedback is received, a user can recover all the information about the original sparse matrix. This identification can be performed using the machine learning methods and systems described herein.

In some embodiments, this approach could also be applied to learning a plurality of 2G, 3G, 4G, 5G, Wi-Fi, or any-G, channels, in any frequency band. In some embodiments, this approach could also be applied to learning other specific channels, e.g., channel performance at a particular time or identified via some other identifier or means. In some embodiments, this approach could also be used for characterizing channels in a cluster of base stations. For example, a cluster of small cells covering a baseball stadium could employ up to 8 channels per base station, which, when multiplied by the number of cells used to cover the stadium (~100 or more), add up to a large number of channels. This scenario highlights that MIMO is not required to add up to a very high number of channels. The approach described herein could be used to individually characterize very specific channels, for example, efficiently characterizing each seat in a stadium after the game has started, without requiring a large training period.

Figure 11:
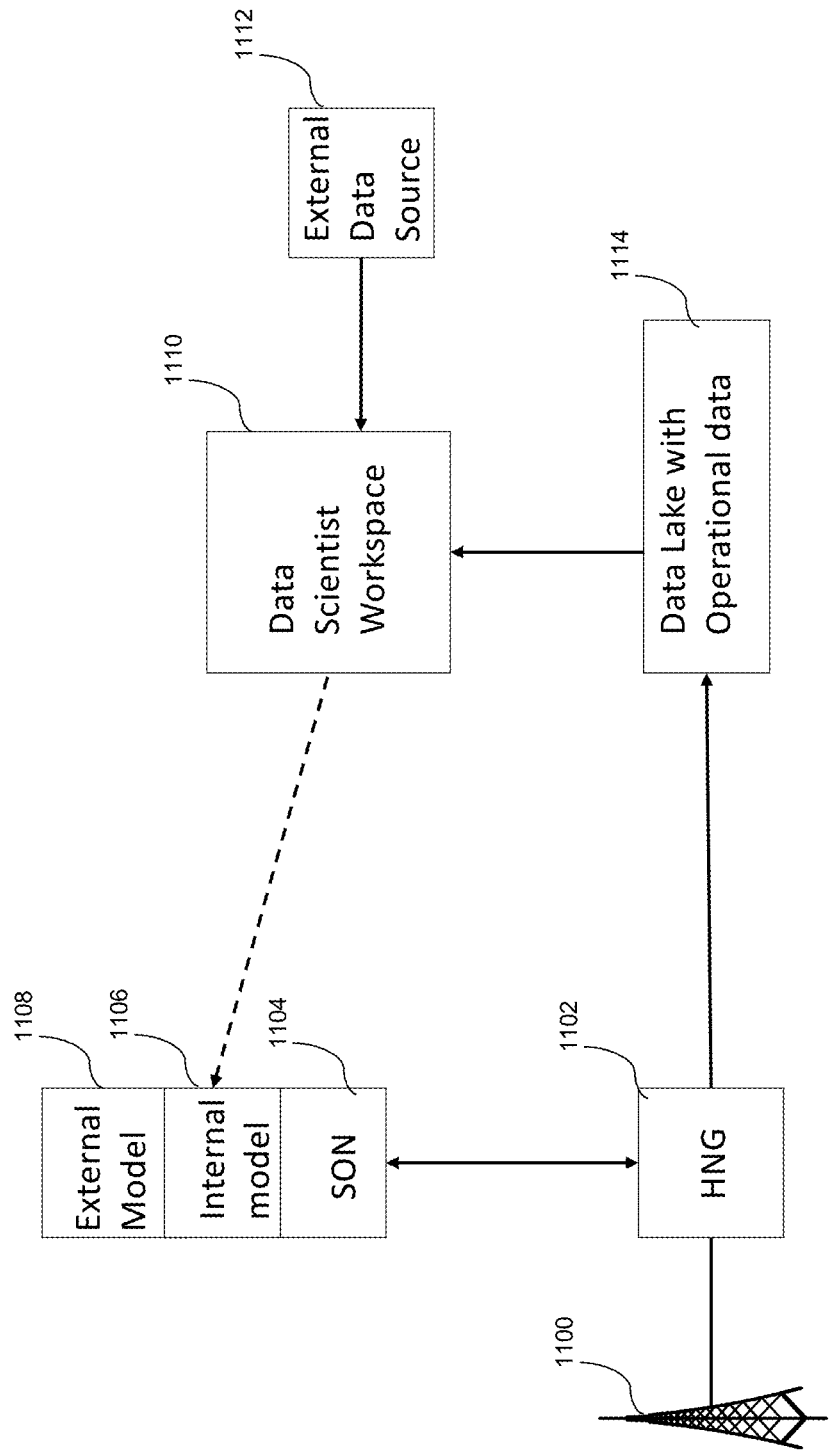
FIG. 11 is a first network diagram showing a deployment of a system providing channel estimation, in accordance with some embodiments.

Referring now to FIG. 11 a deployment scenario is shown. A network system for providing machine learning for channel estimation includes a base station 1100, a HetNet Gateway (HNG) 1102 in wireless communication with the base station, and a Self-Organizing Network (SON) 1104 in communication with the HNG. The SON includes an internal model 1106 and an external model 1108. The network system also includes a data scientist workspace 1110, an external data source 1112 in communication with the data scientist workspace, and a data lake 1114 in communication with the external data source and the HNG. In operation, operational data is collected at the HNG and sent to the data lake, models are developed using data lake data and external source data and deployed to the SON. The SON includes internal models and external models which are used with the models developed using the data lake and external source data to provide input to the SON. The SON supplies the HNG with SON parameters, and the models feedback data to the data lake.

The external model described would be the offline learning that is described herein. The model is not compiled into the SON module; instead it would be run on the PW Big Data Platform, e.g., on an internal network. The model can be built in the data scientist workspace, and can receive data from the data lake. Or, if the data is not there, can be added from another external source. A static model can be created by performing the base learning; multiple times. An intelligent data pipeline collects the UE data. An analyst could build the model, in some embodiments.

In some embodiments, the model sits between RAN and core network, at or adjacent to a coordinating gateway or network orchestrator such as the Parallel Wireless HNG GW. A determination of how good a job the model is doing by examining the runtime results using the same metrics collected at the beginning, compared against the existing model's prediction. In one example, twenty percent of the runtime results are fed through the model, providing a closed loop and updating/retuning the model. The SON receives this data, and then can use this model to feed channels to the base station.

Figure 12:
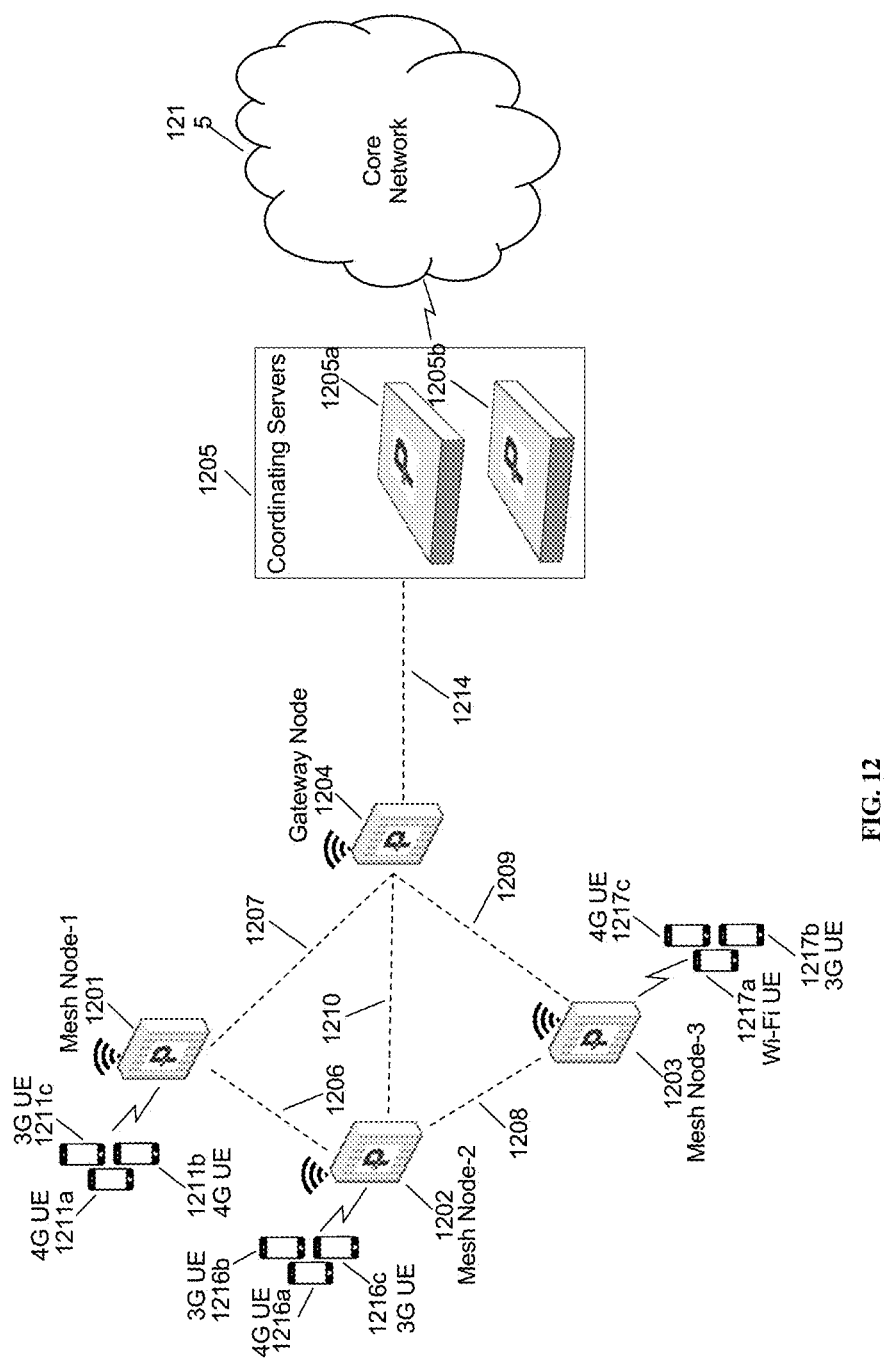
FIG. 12 is a second network diagram, in accordance with some embodiments.

FIG. 12 is a network diagram in accordance with some embodiments. In some embodiments, as shown in FIG. 12, a mesh node-1 1201, a mesh node-2 1202, a mesh node-3 1203 are base stations. The Base stations 1201, 1202, and 1203 form a mesh network establishing mesh network link 1206, 1207, 1208, 1209, and 1210 with a base station 1204. The base station 1204 acts as gateway node or mesh gateway node, and provides backhaul connectivity to a core network to the base stations 1201, 1202, and 1203 over backhaul link 1214 to a coordinating server(s) 1205. The Base stations 1201, 1202, 1203, 1204 may also be known by other names such as eNodeB, NodeB, Access Point, Femto Base Station etc. and may support radio access technologies such as 2G, 3G, 4G, 5G, Wi-Fi etc. The coordinating servers 1205 is shown with two coordinating servers 1205a and 1205b. The coordinating servers 1205a and 1205b may be in load-sharing mode or may be in active-standby mode for high availability. The coordinating servers 1205 may be located between a radio access network (RAN) and the core network and may appear as core network to the base stations in a radio access network (RAN) and a single eNodeB to the core network. As shown in the FIG. 12, various user equipments 1211a, 1211b, 1211c are connected to the base station 1201. The base station 1201 provides backhaul connectivity to the user equipments 1211a, 1211b, and 1211c connected to it over mesh network links 1206, 1207, 1208, 1209, 1210 and 1214. The user equipments may also be known by other names such as mobile devices, mobile phones, personal digital assistant (PDA), tablet, laptop etc. The base station 1202 provides backhaul connection to user equipments 1212a, 1212b, 1212c and the base station 1203 provides backhaul connection to user equipments 1213a, 1213b, and 1213c. The user equipments 1211a, 1211b, 1211c, 1212a, 1212b, 1212c, 1213a, 1213b, 1213c may support any radio access technology such as 2G, 3G, 4G, 5G, Wi-Fi, WiMAX, LTE, LTE-Advanced etc. The base stations 1201, 1202, 1203 may also be known as mesh network nodes 1201, 1202, 1203. Traffic from the base stations 1201, 1202, and 1203 to the core network 1215 through the coordinating server 1205 flows through an IPSec tunnel terminated at the coordinating server 1205. The base station 1201 may utilize a model at coordinating server 1205 to perform the channel characterization described herein.

Figure 13:
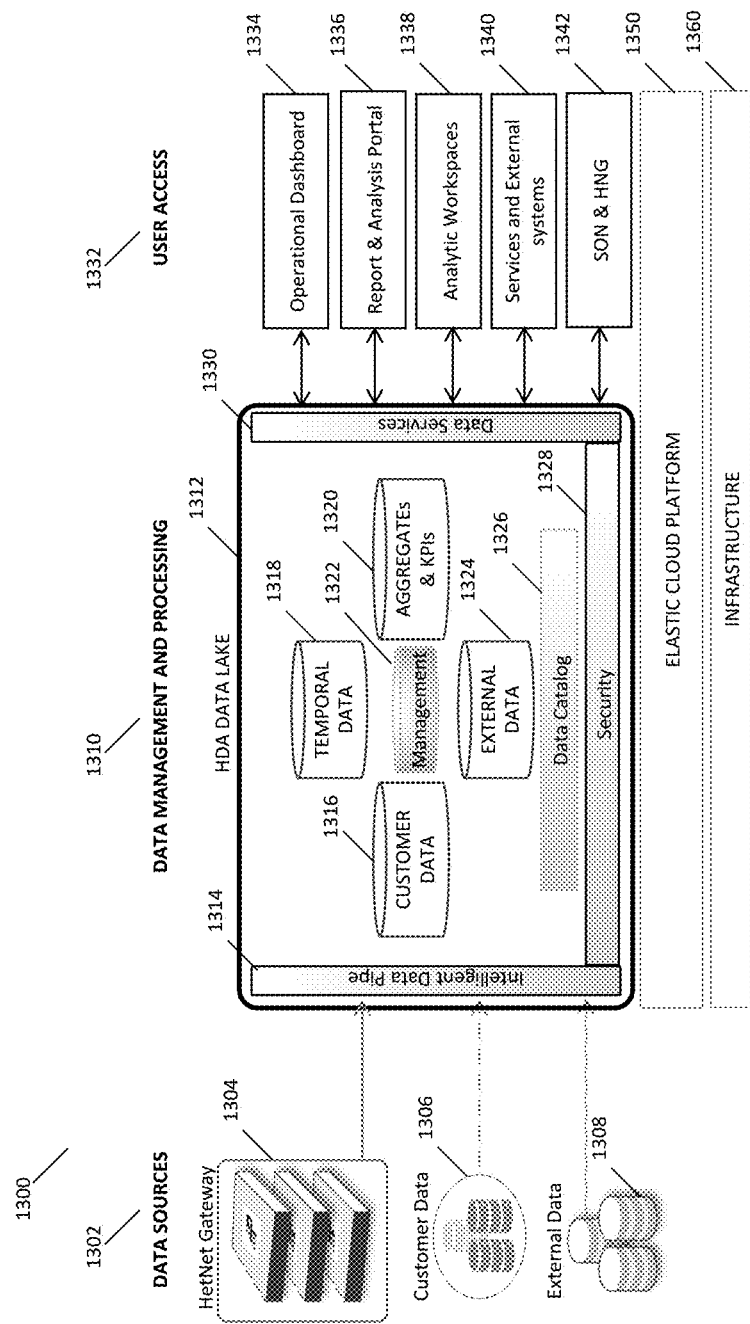
FIG. 13 depicts a diagram of a HetNet Data Analytics (HDA) solution architecture, in accordance with some embodiments.

The HDA solution architecture 1300 is shown in FIG. 13. The architecture 1300 includes data sources 1302. The data sources 1302 in one embodiment include a HetNet Gateway 1304, customer data 1306 and external data 1308. The HetNet Gateway 1304 is a RAN management and virtualization node, described elsewhere herein and in the documents incorporated by reference into this document. The solution architecture 1300 also includes a data management and processing element 1310 in communication with the data sources 1302. The data management and processing element 1310 includes an HDA data lake 1312. The HDA data lake includes an intelligent data pipe 1314 providing an interface to the data sources, as well as various data stores: a customer data store 1316, a temporal data store 1318, an aggregate and KPI store 1320, and an external data store 1324. A management element 1322 is present to manage interconnections between the various data stores. The HDA data lake 1312 also includes a data catalog 1326, a security element 1328 for ensuring secure communications for all data stores based on per-data store policies, and data services element 1330 for interfacing with external user systems. The HDA solution architecture includes a user access element 1332 for providing external user services (see FIG. 4). The user access element 1332 includes, as examples, an operational dashboard 1334, a report and analysis portal 1336, analytic workspaces 1338, services and external systems 1340 and SON and HNG 1342. The HDA architecture 1300 further includes an elastic cloud platform 1350, for providing extensible, virtualized infrastructure on a public or private cloud, and infrastructure hardware 1360, e.g., physical servers and networks. The CNN described herein could run on the HDA architecture 1300, in some embodiments.

In some embodiments, a lightweight agent running in HNG 1304 watches availability of new data and notifies the pipeline 1314. A data pull process is initiated, get data from HNGs Each HNG instance has one of the lightweight agents installed and running. Data types at the HNG could include: counters and stats collected at HNG; CWS locations, configuration parameters—Stats related to HW etc.; alarms and alerts; logs (HNG and CWS); configuration changes; backhaul measurements. Models as described herein could also interface with the HNG as described herein to push or pull data from the UE or to the base station.

Figure 14:
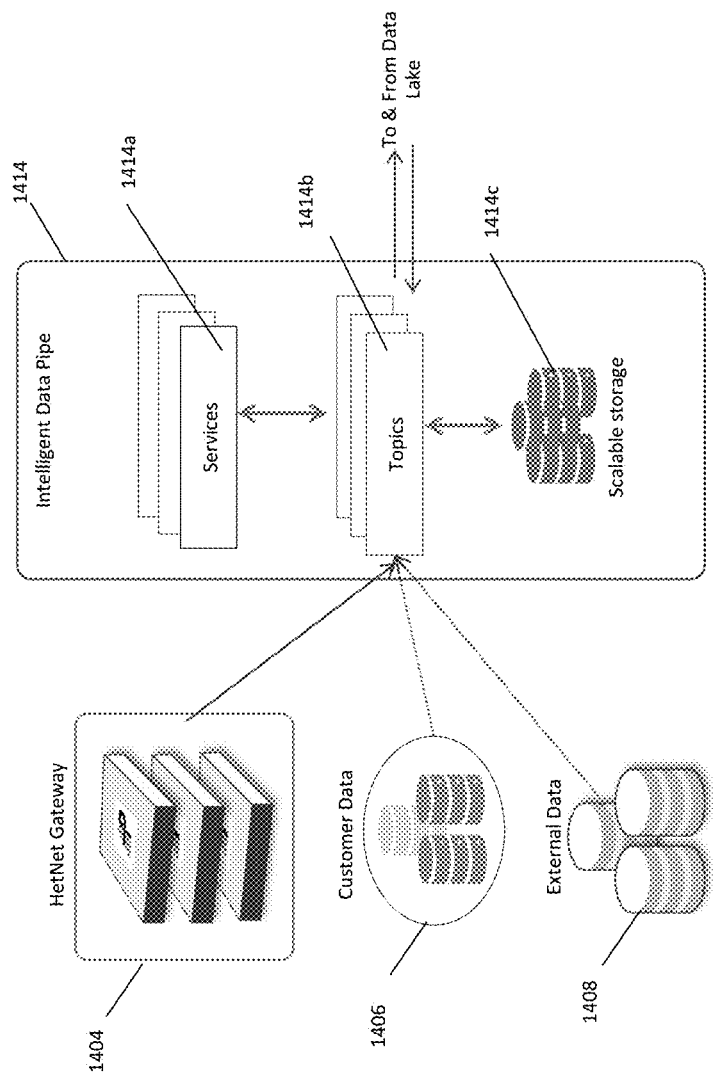
FIG. 14 depicts a diagram of an intelligent data pipe, in accordance with some embodiments.

Referring now to FIG. 14, the intelligent data pipe 1414 is shown. The intelligent data pipe 1414 is in communication with the HetNet Gateway 1404, customer data 1406 and external data 1408. The intelligent data pipe 1414 includes services 1414a and topics 1414b and provides and receives data from the remainder of the data lake. The intelligent data pipe also includes scalable storage 1414c.

The intelligent data pipe 1414 is an orchestrated set of processes defined on-demand to bring in data streams to HDA for processing, provisioned to collect counters, data sets, transactions flowing externally from devices, databases or streams. The intelligent data pipe 1414 provides several different types of functionality. These include the ability to stream data from source to the sink; the ability to configure as a service on-demand from UI or CLI; the ability to support multiple data formats, such as JSON, CSV, XML; and the ability to attach light-weight dynamic data processing services.

The topics 1414b of the intelligent data pipe 1414 comprise highly available queues for data to be written in, from external sources or data lake. The attached in-line services 1414a may have ability for pattern recognition or writing data. The storage 1414c is a fault tolerant temporal storage attached to topics that caches data. The services 1414a comprise micro-services attached in-line to the topics to recognize patterns generating alerts or write data to the destinations. Topics 1414b would be used to implement the CNN functionality described herein, in some embodiments.

Figure 15:
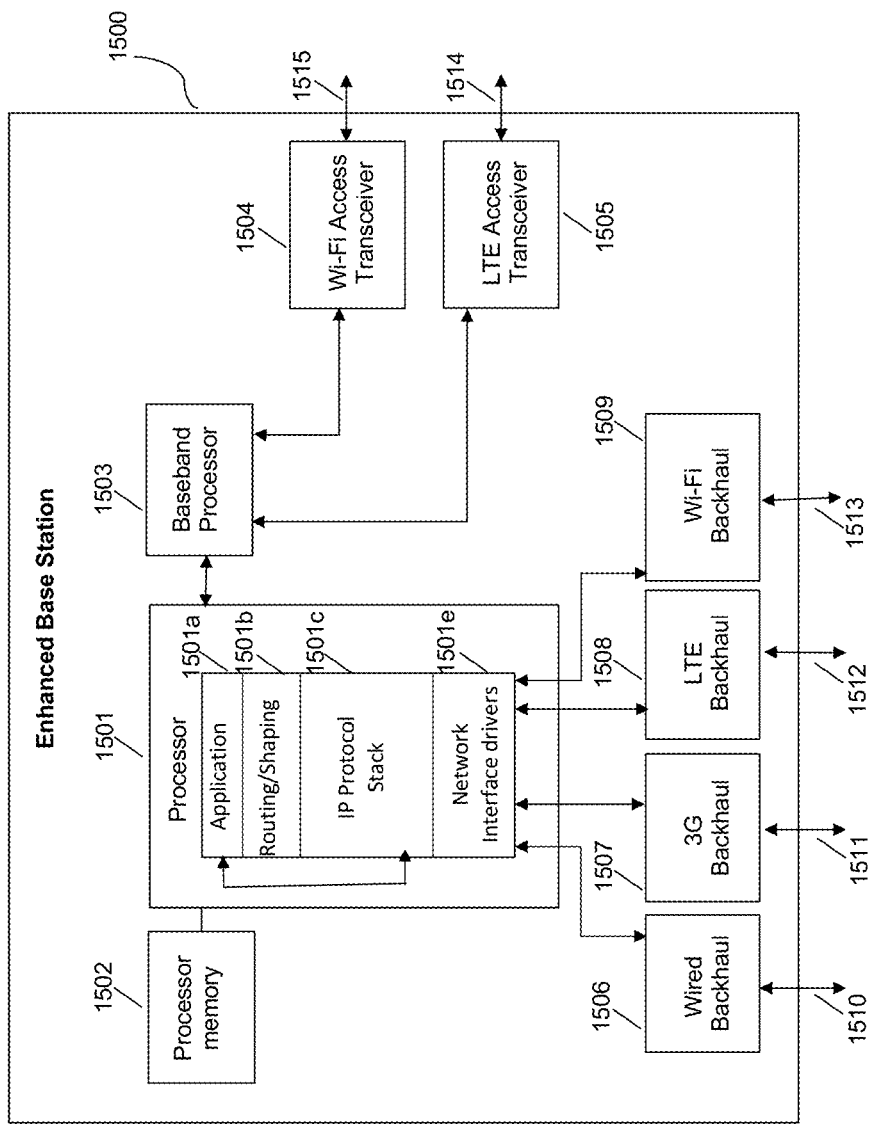
FIG. 15 is a schematic architecture diagram of an exemplary base station, in accordance with some embodiments.

FIG. 15 is a schematic diagram of an enhanced eNodeB, in accordance with some embodiments. Enhanced eNodeB 1500 may include processor 1501, processor memory 1502 in communication with the processor, baseband processor 1503. Enhanced eNodeB 1500 may also include Wi-Fi access transceiver 1504 with access side interface 1515, and LTE access transceiver 1505 with access side interface 1514 and thereby connecting to user equipments (not shown in the figure). Enhanced eNodeB 1500 may also include wired backhaul 1506 with wired backhaul interface 1510, 3G backhaul 1507 with 3G backhaul interface 1511, LTE backhaul 1508 with LTE backhaul interface 1512, and Wi-Fi backhaul 1509 with Wi-Fi backhaul interface 1513. Enhanced eNodeB provides backhaul connectivity via backhaul interfaces 1510, 1511, 1512, and 1513 to user equipments connected to the enhanced eNodeB via access interfaces 1514 and 1515. As shown in the FIG. 15, LTE access transceiver 1505 and Wi-Fi access transceiver are further in communication with baseband processor 1503 that is also in communication with processor 1501.

Processor 1501 and baseband processor 1503 are in communication with one another. Processor 1501 may perform routing functions, and may determine if/when a switch in network configuration is needed. Baseband processor 1503 may generate and receive radio signals for both wi-fi access transceiver 1504 and LTE access transceiver 1505, based on instructions from processor 1501. In some embodiments, processors 1501 and baseband processor 1503 may be on the same physical logic board. In other embodiments, they may be on separate logic boards. Processor 1501 may perform the methods described herein or may communicate with the HNG (see 1205) described herein to perform the channel characterization method described.

The LTE access transceiver 1505 may be a radio transceiver capable of providing LTE eNodeB functionality, and may be capable of higher power and multi-channel OFDMA. The LTE backhaul 1508 may be a radio transceiver capable of providing LTE UE functionality. Both 1505 and 1508 are capable of receiving and transmitting on one or more LTE bands. In some embodiments, either or both of transceivers 1505 and 1508 may be capable of providing both LTE eNodeB and LTE UE functionality. Transceivers 1505 and 1508 may be coupled to processor 1501 via baseband processor 1503. In addition, wired backhaul 1506 coupled to processor 1501 may provide backhaul connectivity to other 3G femto base station via wired ethernet interface 1510. 3G backhaul 1507 coupled to processor may provide 3G wireless backhaul connectivity.

Wired backhaul 1506, or wireless backhaul 1509 may be used. Wired backhaul 1506 may be an Ethernet-based backhaul (including Gigabit Ethernet), or a fiber-optic backhaul connection, or a cable-based backhaul connection, in some embodiments. Additionally, wireless backhaul 1509 may be provided in addition to 3G backhaul 1507 and LTE backhaul 1508, which may be Wi-Fi 1502. 11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1501 may identify the appropriate network configuration may perform execute instructions stored in processor memory 1502 for application layer processing 1501*a*, routing and shaping 1501*b* of packets from one network interface to another accordingly. Processor 1501 may use memory 1502, in particular to store a routing table to be used for routing packets. Baseband processor 1503 may perform operations to generate the radio frequency signals for transmission or retransmission by transceivers such as 1504, 1505, 1507, 1508, 1509. Baseband processor 1503 may also perform operations to decode signals received by transceivers 1504, 1505, 1507, 1508, 1509. Baseband processor 1506 may use memory 1502 to perform these tasks. Further, processor 1501 may perform tagging at tagger 1501*d* that may be part of IP protocol functionality 1501*c* in communication with application layer 1501*a*. Network interface drivers 1501*e* may send and receive messages over backhaul interfaces 1510, 1511, 1512, 1513 via 1506, 1507, 1508, 1509 respectively.

Figure 16:
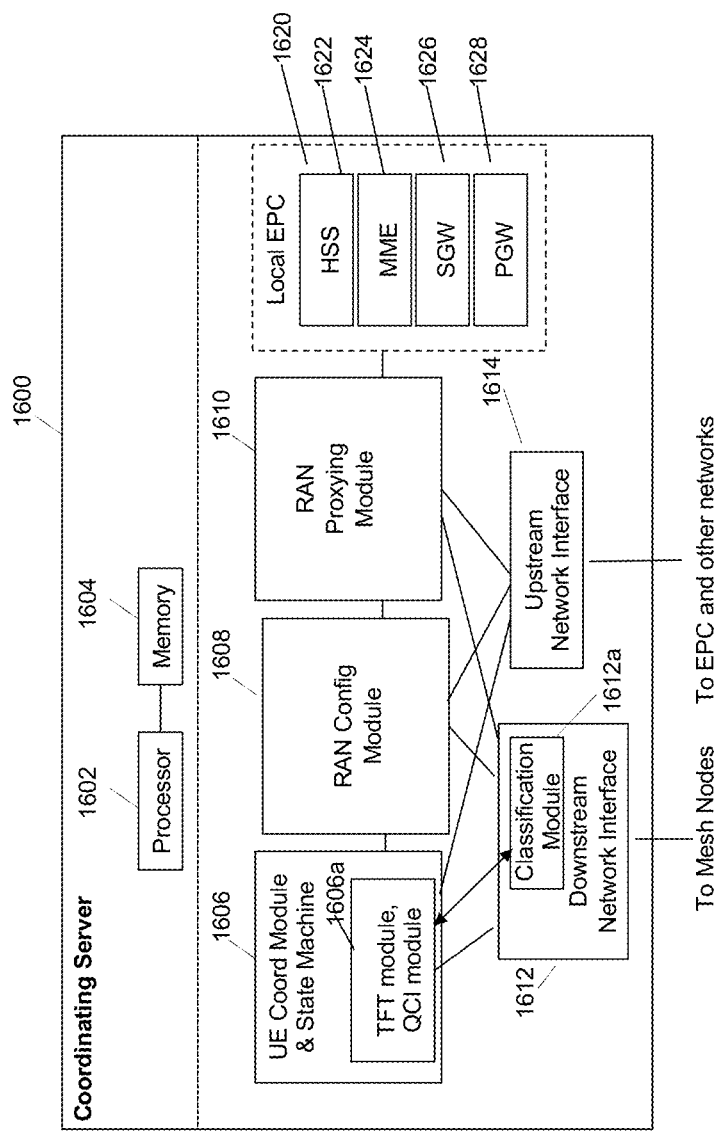
FIG. 16 is a diagram coordinating server for providing services and performing methods as described herein, in accordance with some embodiments.

FIG. 16 is a schematic diagram of a coordinating node, in accordance with some embodiments. The coordinating node may also be known as coordinating server in this disclosure. Coordinating node 1600 includes processor 1602 and memory 1604, which are configured to provide the functions described herein. Also present are UE coordination module and state machine 1606, RAN configuration module 1608, and RAN proxying 1610. UE coordination module 1606, and in particular TFT module/QCI module 1606*a*, may perform the functions described herein for QOS management, including matching incoming traffic to bearers using filters. RAN configuration module 1608 may coordinate installed TFT filters across the network (e.g., at eNodeBs) with TFT module 1606*a*. In some embodiments, coordination server may also provide proxying, routing virtualization and RAN virtualization, via module 1610. In some embodiments, a downstream network interface 1612 is provided for interfacing with the RANs, which may be a radio interface (e.g., LTE), and an upstream network interface 1614 is provided for interfacing with the core network, which may be either a radio interface (e.g., LTE) or a wired interface (e.g., Ethernet). Downstream network interface 1612 may further include classification module 1612*a* in communication with TFT module/QCI module 1606*a*. Classification module 1612*a* may perform classification of traffic before sending message to mesh nodes in downstream direction. Signaling storm reduction functions may be performed in module 1606. The coordinating node may be located in the network as shown in FIG. 1 as signaling coordinator 105.

Coordinating node 1600 includes local evolved packet core (EPC) module 1620, for authenticating users, storing and caching priority profile information, and performing other EPC-dependent functions when no backhaul link is available. Local EPC 1620 may include local HSS 1622, local MME 1624, local SGW 1626, and local PGW 1628, as well as other modules. Local EPC 1620 may incorporate these modules as software modules, processes, or containers. Local EPC 1620 may alternatively incorporate these modules as a small number of monolithic software processes. Modules 1606, 1608, 1610 and local EPC 1620 may each run on processor 1602 or on another processor, or may be located within another device.

In some embodiments, the gateway of FIG. 16 may be a virtualized radio access network or may provide virtual network functions (VNFs). For example, the gateway of FIG. 16 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

In any of the scenarios described herein, where processing may be performed at the cell, the processing may also be performed in coordination with a cloud coordination server.

A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of machine learning for channel estimation, comprising:
 performing training using superimposed pilot subcarriers to determine training data; the performing training comprising:
 starting with a training duration (T) equal to a number of antennas (M),
 running a Convolutional Neural Network (CNN) model using training samples to determine if a testing variance meets a predefined threshold,
 when the testing variance meets a predefined threshold, then reducing T by one half and repeating the running Convolutional Neural Network (CNN) model using training samples and reducing the T by one half until the testing variance fails to meet the predefined threshold, and when the testing variance fails to meet the predefined threshold, then multiplying T by two and using the new value of T as the new training duration to be used;

generating a run-time model based on the training data;

updating the run-time model with new feedback data received from a User Equipment (UP;

producing a downlink channel estimation from the run-time model; and producing a precoding matrix from the downlink channel estimation.

2. The method of claim 1 further comprising:

allowing a predetermined number of paths to include both of an original static nature of the path and a new dynamic path; and learning by the model based on the dynamic path data.

3. The method of claim 1 further comprising using a different number of antennas to be used in a different configuration of a radio transceiver.

4. The method of claim 1 wherein the channel estimation is per-slot, per-subcarrier, or per-User Equipment (UE).

5. The method of claim 1 wherein the predefined threshold comprises a means-square error against the fully-known channel.

6. The method of claim 5 wherein the means-square error against the fully-known channel is less than 0.5 percent of the known channel.

7. The method of claim 1 wherein the model is recalibrated offline.

8. The method of claim 1 wherein the model is recalibrated periodically.

9. The method of claim 1 wherein the channels are 2G, 3G, 4G, 5G, or Wi-Fi channels.

10. A non-transitory computer-readable medium containing instructions for providing machine learning for channel estimation which, when executed, cause a network system to perform steps comprising:

performing training using superimposed pilot subcarriers to determine training data; the performing training comprising:

starting with a training duration (T) equal to a number of antennas (M);

running a Convolutional Neural Network (CNN) model using training samples to determine if a testing variance meets a predefined threshold;

when the testing variance meets a predefined threshold, then reducing T by one half and repeating the running Convolutional Neural Network (CNN) model using training samples and reducing the T by one half until the testing variance fails to meet the predefined threshold; and when the testing variance fails to meet the predefined threshold, then multiplying T by two and using the new value of T as the new training duration to be used;

generating a run-time model based on the training data;

updating the run-time model with new feedback data received from a User Equipment (UE);

producing a DL channel estimation from the run-time model; and producing a precoding matrix from the DL channel estimation.

11. The non-transitory computer-readable medium of claim 10 further comprising instructions for allowing a predetermined number of paths to include both of an original static nature of the path and a new dynamic path; and learning by the model based on the dynamic path data.

12. The non-transitory computer-readable medium of claim 10 further comprising instructions for using a different number of antennas.

13. The non-transitory computer-readable medium of claim 10 further comprising instructions wherein the channel estimation is per-slot, per-subcarrier, or per-User Equipment (UE).

14. The non-transitory computer-readable medium of claim 10 further comprising instructions wherein the predefined threshold comprises a means-square error against the fully-known channel.

15. The non-transitory computer-readable medium of claim 10 further comprising instructions wherein the model is recalibrated offline and wherein the model is recalibrated periodically.

16. The non-transitory computer-readable medium of claim 10 further comprising instructions wherein the channels are 2G, 3G, 4G, 5G, or Wi-Fi channels.

* * * * *